(12) United States Patent
Ahmed et al.

(10) Patent No.: US 12,435,189 B1
(45) Date of Patent: Oct. 7, 2025

(54) BIOMASS-ENHANCED POLYMERIC COMPOSITE WITH PROSOPIS CINERARIA FOR SUSTAINABLE CONSTRUCTION AND THERMAL INSULATION APPLICATIONS

(71) Applicant: United Arab Emirates University, Al Ain (AE)

(72) Inventors: Waleed Ahmed, Al Ain (AE); Noura Al Mazrouei, Al Ain (AE); Ali Al Marzouqi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/033,860

(22) Filed: Jan. 22, 2025

(51) Int. Cl.
*C08J 3/20* (2006.01)

(52) U.S. Cl.
CPC ........... *C08J 3/201* (2013.01); *C08J 2367/04* (2013.01)

(58) Field of Classification Search
CPC .................................................... C08J 2367/04
See application file for complete search history.

(56) References Cited

U.S. PATENT DOCUMENTS

2025/0051576 A1* 2/2025 Li ........................... C08L 97/02

OTHER PUBLICATIONS

Himanshu et al. (Mechanical strength analysis of bio composite made by using micro powder made of Prosopis cineraria wood, International Journal of Science and Research Archive, 2024, 13(01), 1877-1883). (Year: 2024).*

* cited by examiner

*Primary Examiner* — Robert T Butcher
(74) *Attorney, Agent, or Firm* — MH2 Technology Law Group, LLP

(57) ABSTRACT

The present disclosure in general relates to the field of biocomposite materials for construction and structural applications (e.g. biomass-enhanced polymeric composites for sustainable construction and thermal insulation applications). The present disclosure is further directed towards a biocomposite material comprising a polymer matrix. The polymer matrix comprises polylactic acid and a plurality of reinforcement particles comprising *Prosopis cineraria*. The plurality of reinforcement particles are dispersed within the polymer matrix. The present disclosure also relates to a method of manufacturing a biocomposite material comprising a polymer matrix. The method comprises the steps of: obtaining polylactic acid; obtaining a plurality of reinforcement particles comprising *Prosopis cineraria*; mixing polylactic acid and a plurality of reinforcement particles comprising *Prosopis cineraria* to form a polymer matrix, wherein the plurality of reinforcement particles are dispersed within the polymer matrix; and molding the polymer matrix to form the biocomposite material.

7 Claims, 8 Drawing Sheets

BIOMASS-ENHANCED POLYMERIC COMPOSITE WITH PROSOPIS CINERARIA FOR SUSTAINABLE CONSTRUCTION AND THERMAL INSULATION APPLICATIONS

TECHNICAL FIELD

The present disclosure in general relates to the field of biocomposite materials for construction and structural applications (e.g. biomass-enhanced polymeric composites for sustainable construction and thermal insulation applications). The present disclosure is further directed towards a biocomposite material comprising a polymer matrix. The present disclosure also relates to a method of manufacturing a biocomposite material comprising a polymer matrix.

BACKGROUND

The information in this section merely provides background information that will be useful in understanding the present disclosure and may not constitute prior art(s) for the present disclosure.

Several materials used in the construction industry have the potential to pollute the environment. While there is extensive pollution in the form of construction waste, Winstead (2024) adds that more materials, including those that are marketed as sustainable, consume excessive energy to create and maintain, substantially contributing to carbon dioxide emissions and the carbon footprint. The EPA reports that the situation is dire, considering that the United States, which produces the most household waste globally, reported that construction waste was more than double its household waste. The Environmental Protection Agency (2024) states that waste from the construction industry includes debris from construction and demolition that is not part of municipal waste and includes wood and steel products, plaster, drywall, tiles (brick and clay), asphalt shingles, asphalt concrete, and concrete. Building materials are the most common manufactured and fundamental materials in the construction industry, whose excessive demand contributes to greenhouse emissions and global warming (Chen et al., 2024).

The United Nations Environment Program (2024) adds that the construction industry substantially contributes to climate change by accounting to approximately 21% of greenhouse emissions globally. Besides the direct problems, the UKGBC Team (2024) elucidates additional embodied ecological impacts of construction materials, including water pollution, loss of habitats and habitat fragmentation, deforestation, soil erosion, contamination, compaction, and environmental damage by related infrastructure. According to Mehra et al. (2022), an increase in the use of crude materials in building and construction continues to diminish natural resources and increase ecological shocks such as carbon dioxide emissions. Considering that the construction industry contributes significantly to the anthropogenic environmental damage, the industry needs to enhance sustainability.

In line with the challenges posed by conventional materials in the construction industry, the sector progressively appreciates sustainable materials, including biodegradable polymers, as worthwhile alternatives. The World Economic Forum (2024) highlights the need to implement sustainable building practices considering the accelerating global construction. Sustainable construction has seen an increase in advanced materials that enhance structural performance while contributing to environmental conservation (Nwokediegwu et al., 2024). Green composites, including bio-based resins and natural fibers, are sustainable alternatives to conventional construction materials, given their great potential to reduce greenhouse emissions (Chen et al., 2024). The composite materials have remarkable mechanical properties and reduced carbon footprint, aligning with sustainable and eco-friendly practices (Le & Nguyen, 2024).

Biopolymers have gained prominence as construction materials; they are a key answer to the ecological concern of the environmental pollution that stems from non-biodegradable plastics (Megha et al., 2024). The possibility of creating biopolymers from natural resources makes them an essential alternative in the construction industry. Common biodegradable polymers include polylactic acid (PLA), polyhydroxyalkanoates (PHA), polycaprolactone (PCL), Polyvinyl alcohol (PVA), and cellulose- and starch-based plastics (Righetti et al., 2024). In essence, the use of these materials significantly reduces the extraction of raw materials, reduces energy consumption, and the associated greenhouse emissions, contributing to enhanced sustainability in construction.

There is growing market interest in sustainable, high-performance materials, especially in the construction and packaging sectors focused on reducing environmental impact and adopting greener alternatives. In particular, there is an increased demand for viable composite materials which exhibit enhanced mechanical and thermal properties whilst at the same time being biodegradable and water resistant, making it ideal for green building applications and suit industries producing sustainable packaging.

The present disclosure is directed to overcome one or more limitations stated above or any other limitations associated with the known arts.

SUMMARY

One or more shortcomings of the prior art are overcome by the present invention as claimed and additional advantages are provided through the present disclosure. Additional features and advantages are realized through the techniques of the present disclosure. Other embodiments, implementations and aspects of the disclosure are described in detail herein and are considered a part of the claimed disclosure.

According to a first aspect of the disclosure, provided herein is a biocomposite material comprising a polymer matrix. The polymer matrix comprises polylactic acid and a plurality of reinforcement particles comprising *Prosopis cineraria*. The plurality of reinforcement particles are dispersed within the polymer matrix.

The present inventors have surprisingly discovered that the biocomposite material according to the present invention boasts several key features that set it apart as a sustainable and high-performance biocomposite. By blending reinforcement particles comprising *Prosopis cineraria* with polylactic acid (herein referred to as "PLA"), the biocomposite material exhibits several surprising advantages over conventional materials, particularly in terms of mechanical performance, thermal insulation, moisture resistance, and environmental sustainability, enabling multifunctional applications in construction and structural components. For example, the mechanical properties include enhanced compression strength, yield strength, and elastic modulus. Additionally, the biocomposite material of the present invention exhibits superior ductility, measured as a significant increase in elongation before failure, which allows it to withstand higher loads and deformation without compromising strength. The biocomposite material according to the present invention significantly reduces the dependency on synthetic polymers, achieving enhanced biodegradability and reducing the carbon footprint in construction applications. Furthermore, the biocomposite material according to the present invention:

Demonstrates thermal stability and insulation properties, enabling its use in high-temperature environments for energy-efficient and heat-resistant structural components;

Supports green construction initiatives by providing a fully biodegradable and renewable material with enhanced lifecycle performance, reducing construction waste, and promoting sustainability; and is adaptable for modular construction applications, offering tunable mechanical and thermal properties through controlled reinforcement particle concentration and process conditions.

According to a second aspect of the disclosure, provided herein is a method of manufacturing a biocomposite material comprising a polymer matrix. The method comprises the steps of: obtaining polylactic acid; obtaining a plurality of reinforcement particles comprising *Prosopis cineraria*; mixing polylactic acid and a plurality of reinforcement particles comprising *Prosopis cineraria* to form a polymer matrix, wherein the plurality of reinforcement particles are dispersed within the polymer matrix; and molding the polymer matrix to form the biocomposite material. The biocomposite material may be a biocomposite material according to the first aspect of the present disclosure.

According to a third aspect of the disclosure, provided herein is a biocomposite material obtained from the method according to the second aspect of the present disclosure.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

Figure 1:
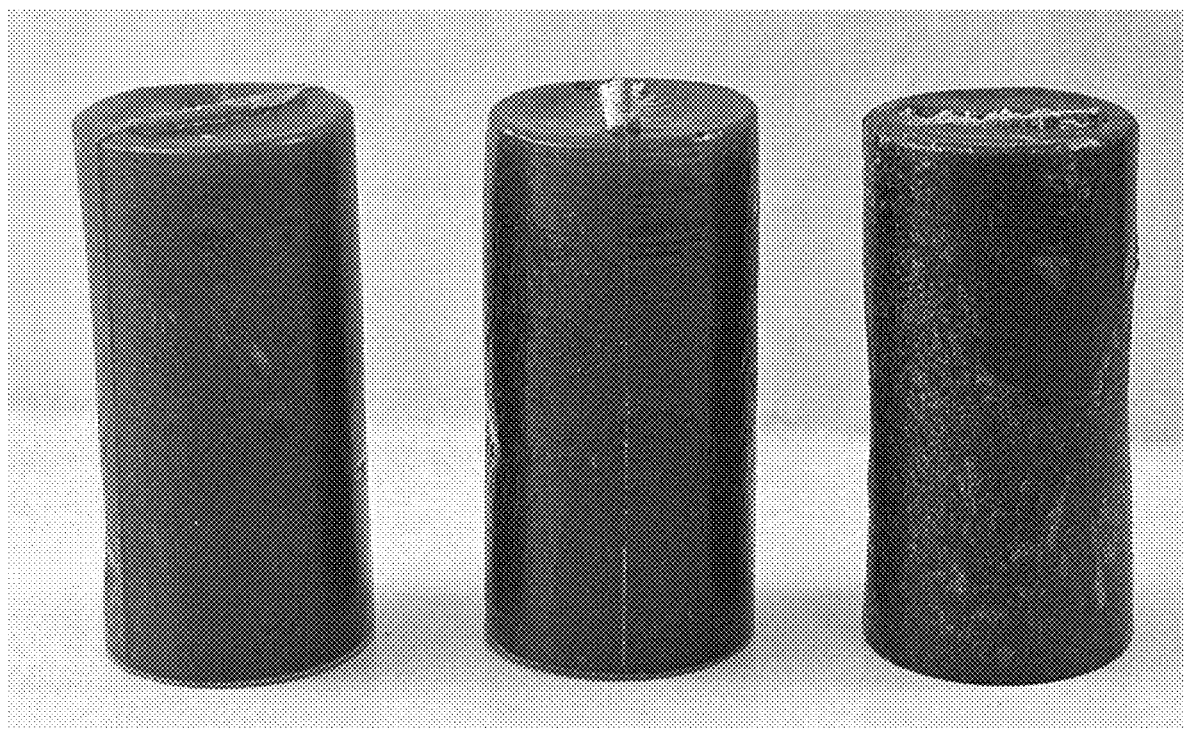
FIG. 1 illustrates exemplary biocomposite material molds, in accordance with an embodiment of the present invention.

The foregoing and other objects, features and advantages of the present invention, as well as the invention itself, will be more fully understood from the following description of preferred embodiments, when read together with the accompanying drawings.

DETAILED DESCRIPTION

In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

As used herein, the term "a" or "an" means one or more. The term "plurality" means two or more. For example, the term "plurality of reinforcement particles'" means two or more reinforcement particles.

As used herein, the term "comprising" is inclusive or open-ended and does not exclude any additional elements; the term "consisting of" excludes any additional elements; and the term "consisting essentially of" is in-between, only permitting additional elements that do not materially affect characteristics of the product or process.

As used herein, the term "approximately" or "about" means plus or minus 10 percent of the value stated.

The expressions "completely free", "free of", or similar expressions used herein mean that the composition or article comprises 0 wt. % of the stated component. That is, the component has not been intentionally added. However, it will be appreciated that such components may incidentally form thereafter, under some circumstances, or such component may be incidentally present, e.g., as an incidental contaminant.

As used herein, the terms "wt. %", "% wt.", "weight %", and "% by weight" are synonyms to each other. All of these expressions are referring to a weight percentage of the respective component. Unless otherwise stated, all percentages, ratios, parts, and amounts used and described herein are by weight.

As used herein, the term "reinforcement particles" are particles which are incorporated dispersed into a matrix (such as a polymer, metal, or ceramic) to enhance the mechanical, thermal, or functional properties of the matrix. The reinforcement particles described herein comprise *Prosopis cineraria*. In preferred embodiments, the reinforcement particles consist of (e.g. consist essentially of) *Prosopis cineraria*. In preferred embodiments, the reinforcement particles are *Prosopis cineraria*.

According to a first aspect of the disclosure, provided herein is a biocomposite material comprising a polymer matrix. The polymer matrix comprises polylactic acid and a plurality of reinforcement particles comprising *Prosopis cineraria*. The plurality of reinforcement particles are dispersed within the polymer matrix.

In some embodiments, the polymer matrix consists of (e.g. consist essentially of) polylactic acid and the plurality of reinforcement particles comprising *Prosopis cineraria*. In some embodiments, the reinforcement particles consist of (e.g. consist essentially of) *Prosopis cineraria*. In preferred embodiments, the reinforcement particles are *Prosopis cineraria*.

According to an embodiment of the invention, the plurality of reinforcement particles are present in an amount less than about 30 wt. % based on the total weight of the polymer matrix. For example, the plurality of reinforcement particles may be present in an amount less than about 25 wt. %, less than less than about 20 wt. %, less than about 19 wt. %, less than about 18 wt. %, less than about 17 wt. %, less than about 16 wt. % or less than about 15 wt. %, based on the total weight of the polymer matrix. In some embodiments, the plurality of reinforcement particles are present in an amount more than about 0.5 wt. % based on the total weight of the polymer matrix. For example, the plurality of reinforcement particles may be present in an amount more than about 1 wt. %, more than more than about 2 wt. %, more than about 3 wt. %, more than about 4 wt. % or more than about 5 wt. %, based on the total weight of the polymer matrix.

In some embodiments, the plurality of reinforcement particles are present in an amount between about 0.5 wt. % to about 30 wt. %, based on the total weight of the polymer matrix. Preferably, the plurality of reinforcement particles are present in an amount between about 1 wt. % to about 25 wt. %, between about 2 wt. % to about 20 wt. %, between about 3 wt. % to about 24 wt. % or between about 4 wt. % to about 23 wt. %, based on the total weight of the polymer matrix. More preferably, the plurality of reinforcement particles are present in an amount between about 5 wt. % to about 15 wt. %, based on the total weight of the polymer matrix.

In some embodiments, the total amount of reinforcement particles present in the polymer matrix is equivalent to the total amount of reinforcement particles present in biocomposite material. For example, in some embodiments, the plurality of reinforcement particles are present in an amount between about 0.5 wt. % to about 30 wt. %, preferably in an amount between about 5 wt. % to about 15 wt. %, based on the total weight of the biocomposite material.

According to an embodiment of the invention, the plurality of reinforcement particles have an average particle diameter of less than about 500 μm. For example, the plurality of reinforcement particles have an average particle diameter of less than about 450 μm, less than about 400 μm, less than about 350 μm, less than about 300 μm, less than about 250 μm or less than about 200 μm. Preferably, the plurality of reinforcement particles have an average particle diameter of less than about 195 μm, less than about 190 μm, less than about 185 μm, less than about 180 μm, less than about 175 μm, less than about 170 μm or less than about 165 μm. More preferably, the plurality of reinforcement particles have an average particle diameter of about 160 μm.

In some embodiments, the plurality of reinforcement particles have an average particle diameter of more than about 50 μm. For example, the plurality of reinforcement particles have an average particle diameter of more than about 75 μm, more than about 100 μm, more than about 125 μm or more than about 150 μm. Preferably, the plurality of reinforcement particles have an average particle diameter of more than about 155 μm. More preferably, the plurality of reinforcement particles have an average particle diameter of about 160 μm.

In some embodiments, the plurality of reinforcement particles have an average particle diameter between about 50 μm to about 500 μm. For example, the plurality of reinforcement particles have an average particle diameter between about 100 μm to about 400 μm, between about 125 μm to about 300 μm, or between about 150 μm to about 200 μm. In a preferred embodiment, the plurality of reinforcement particles have an average particle diameter between about 50 μm to about 200 μm. In one embodiment, the plurality of reinforcement particles have an average particle diameter between about 100 μm to about 200 μm. Preferably, the plurality of reinforcement particles have an average particle diameter between about 150 μm to about 170 μm. More preferably, the plurality of reinforcement particles have an average particle diameter between about 155 μm to about 165 μm.

According to an embodiment of the present invention, the biocomposite material exhibits a compression strength in the range of about 60 MPa to about 85 MPa. For example, the biocomposite material may exhibit a compression strength in the range of about 70 MPa to about 85 MPa. In some embodiments, the biocomposite material exhibits a compression strength in the range of about 67 MPa to about 77 MPa, preferably about 71 MPa to about 73 MPa. In some embodiments, the biocomposite material exhibits a compression strength in the range of about 71 MPa to about 81 MPa, preferably about 75 MPa to about 77 MPa. In some embodiments, the biocomposite material exhibits a compression strength in the range of about 75 MPa to about 85 MPa, preferably about 79 MPa to about 81 MPa.

According to an embodiment of the present invention, the biocomposite material exhibits an elastic modulus in the range of about 1500 MPa to about 3000 MPa. For example, the biocomposite material may exhibit an elastic modulus in the range of about 1600 MPa to about 2800 MPa. In some embodiments, the biocomposite material exhibits an elastic modulus in the range of about 1400 MPa to about 1800 MPa, preferably about 1600 MPa to about 1700 MPa. In some embodiments, the biocomposite material exhibits an elastic modulus in the range of about 1900 MPa to about 2300 MPa, preferably about 2100 MPa to about 2200 MPa. In some embodiments, the biocomposite material exhibits an elastic modulus in the range of about 2500 MPa to about 2900 MPa, preferably about 2700 MPa to about 2800 MPa.

According to an embodiment of the present invention, the biocomposite material exhibits an improved ductility, measured as a percentage of elongation before failure, in the range of about 20.0% to about 50.0%. For example, the biocomposite material may exhibit an improved ductility in the range of about 25.0% to about 40.0%. In some embodiments, the biocomposite material exhibits an improved ductility in the range of about 21.0% to about 31.0%, preferably about 24.0% to about 28.0%. In some embodiments, the biocomposite material exhibits an improved ductility in the range of about 26.0% to about 36.0%, preferably about 29.0% to about 33.0%. In some embodiments, the biocomposite material exhibits an improved ductility in the range of about 32.0% to about 42.0%, preferably about 35.0% to about 39.0%.

According to an embodiment of the present invention, the biocomposite material exhibits thermal insulation in the range of about 4.0 mK/W to about 6.0 mK/W. For example, the biocomposite material may exhibit thermal insulation in the range of about 4.2 mK/W to about 5.4 mK/W. In some embodiments, the biocomposite material exhibits thermal insulation in the range of about 4.0 mK/W to about 5.0 mK/W, preferably about 4.2 mK/W to about 4.6 mK/W. In some embodiments, the biocomposite material exhibits thermal insulation in the range of about 4.9 mK/W to about 5.5 mK/W. In some embodiments, the biocomposite material exhibits thermal insulation in the range of about 5.3 mK/W to about 5.9 mK/W.

According to an embodiment of the present invention, the biocomposite material exhibits a reduction in overall water absorption capacity with a water absorption rate of about 0.05% to about 0.40%. The water absorption rate measure the water-resistant properties of the biocomposite material. For example, the biocomposite material may exhibit a water absorption rate in the range of about 0.08% to about 0.37%. In some embodiments, the biocomposite material exhibits a water absorption rate in the range of about 0.29% to about 0.39%. In some embodiments, the biocomposite material exhibits a water absorption rate in the range of about 0.12% to about 0.32%. In some embodiments, the biocomposite material exhibits a water absorption rate in the range of about 0.06% to about 0.16%. In some embodiments, the material exhibits a reduction in overall water absorption capacity with a water absorption rate of about 0.11%, wherein the plurality of reinforcement particles are present in an amount about 15 wt. %, based on the total weight of the polymer matrix.

According to a second aspect of the disclosure, provided herein is a method of manufacturing a biocomposite material comprising a polymer matrix. The method comprises the steps of: obtaining polylactic acid; obtaining a plurality of reinforcement particles comprising *Prosopis cineraria*; mixing polylactic acid and a plurality of reinforcement particles comprising *Prosopis cineraria* to form a polymer matrix, wherein the plurality of reinforcement particles are dispersed within the polymer matrix; and molding the polymer matrix to form the biocomposite material. The biocomposite material may be a biocomposite material according to the first aspect of the present disclosure.

In an embodiment according to the present invention, obtaining the plurality of reinforcement particles comprising *Prosopis cineraria* comprises the steps of: obtaining the *Prosopis cineraria* from a natural source; and grinding the *Prosopis cineraria* to obtain the plurality of reinforcement particles comprising *Prosopis cineraria*.

In some embodiments, obtaining the plurality of reinforcement particles comprising *Prosopis cineraria* comprises the step of obtaining the *Prosopis cineraria* from a natural source. For example, *Prosopis cineraria* may be extracted from a plant (e.g. a tree).

In some embodiments, obtaining the plurality of reinforcement particles comprising *Prosopis cineraria* comprises the step of grinding the *Prosopis cineraria* to obtain the plurality of reinforcement particles comprising *Prosopis cineraria*. The *Prosopis cineraria* may be grinded to a powder form. In some embodiments, a grinder (e.g. a heavy-duty grinder) may be used for approximately 1-10 minutes (preferably about 4-6 minutes) to obtain the plurality of reinforcement particles comprising *Prosopis cineraria*.

The plurality of reinforcement particles may be prepared by any known method, to clean the particles. In some embodiments, before grinding, the *Prosopis cineraria* is processed to be cleaned. For example, the method may comprise the step of cutting, washing and drying the *Prosopis cineraria* before grinding.

In some embodiments, the method may comprise the step of cutting the *Prosopis cineraria* before grinding. For example, the *Prosopis cineraria* (e.g. *Prosopis cineraria* leaves and/or stems) may be trimmed to a smaller size. The step of trimming may be performed by any conventional method.

In some embodiments, the method may comprise the step of washing the *Prosopis cineraria* before grinding. The step of washing may be performed by any conventional method (e.g. to remove any dust particles and/or insects thereon).

In some embodiments, the method may comprise the step of drying the *Prosopis cineraria* before grinding. In an embodiment according to the present invention, the step of drying may be performed by any conventional method. For example, the *Prosopis cineraria* may be dried by a source of heat (e.g. the sun). In some examples, the *Prosopis cineraria* is dried under the sun for approximately 1-5 days (preferably about 3 days).

In some embodiments, the method may comprise the step of drying the *Prosopis cineraria* after grinding. The step of dying may be performed by any conventional method. For example, the *Prosopis cineraria* may be dried in an oven. In some examples, the *Prosopis cineraria* is dried in an oven at 45° C. for approximately 12-48 hours (preferably about 24 hours).

The desired average particle size may be prepared by any known method, such as sieving the particles through a mesh. In an embodiment according to the present invention, the method further comprises the step of sieving the *Prosopis cineraria* after grinding. The *Prosopis cineraria* may be sieved (e.g. using an automatic or manual mesh) to obtain the desired average particle size for the reinforcement particles. In some embodiments, the *Prosopis cineraria* is sieved to obtain a plurality of reinforcement particles having an average particle diameter between about 50 µm to about 500 µm. In a preferred embodiment, the *Prosopis cineraria* is sieved to obtain a plurality of reinforcement particles having an average particle diameter between about 50 µm to about 200 µm. For example, the plurality of reinforcement particles have an average particle diameter between about 100 µm to about 400 µm, between about 125 µm to about 300 µm, or between about 150 µm to about 200 µm. In one embodiment, the plurality of reinforcement particles have an average particle diameter between about 100 µm to about 200 µm. Preferably, the plurality of reinforcement particles have an average particle diameter between about 150 µm to about 170 µm. More preferably, the plurality of reinforcement particles have an average particle diameter between about 155 µm to about 165 µm. In a preferred embodiment, the *Prosopis cineraria* is sieved to obtain a plurality of reinforcement particles having an average particle diameter of about 160 µm.

In an embodiment according to the present invention, the step of mixing polylactic acid and a plurality of reinforcement particles comprising *Prosopis cineraria* to form a polymer matrix, may be performed by any known method. In some embodiments, the step of mixing comprises using a mechanical mixer. For example, the polymer matrix may be formed by mixing polylactic acid and a plurality of reinforcement particles comprising *Prosopis cineraria* at a speed at 60 rpm for 6 minutes at approximately 190° C.

In an embodiment according to the present invention, the step of molding may be performed by any known method, such as injection molding. In some embodiments, the polymer matrix may be fed into an injection molding machine at approximately 185° C. to obtain a biocomposite material. In a preferred embodiment, the mixing is conducted at about 60 rpm and about 190° C. and the molding is injection molding at about 185° C., to achieve sustainable and scalable production with minimal environmental impact.

The method may further comprise a step of cooling the formed biocomposite material for a set amount of time to stabilize the mechanical properties (e.g. ensuring uniform mechanical property stabilization, including compression strength, elastic modulus, and ductility). For example, the biocomposite material may be cooled in stainless-steel molds under controlled conditions for approximately 45 minutes. According to an embodiment of the present invention, the method further comprises the step of cooling the biocomposite material after molding. The step of colling may be performed by any known method, such as a controlled cooling process. For example, the step of cooling comprises a controlled cooling process for about 30 minutes to about 90 minutes. Preferably, the controlled cooling process lasts for about 30 minutes to about 60 minutes, more preferably for about 35 minutes to 50 minutes, even more preferably for about 45 minutes. In some embodiments, the cooling process may be done in stainless steel molds.

EXAMPLES

The following definitions of terms and determination methods apply for the above general description of the invention as well as to the below examples unless otherwise defined. The following non-limiting examples are provided to illustrate an embodiment of the present invention and to facilitate understanding of the invention but are not intended to limit the scope of the invention, which is defined by the claims appended hereto.

Material and Process

The reinforcement particles were obtained as follows: *Prosopis Cineraria* (referred to herein as "Ghaf") is a domestic tree that was collected from a private farm ALAin, UAE, after trimming the tree to enhance its appearance. The Ghaf leaves and stems were collected and cut down, then washed with water twice to remove any dust or insects that were stuck on the surface, during the washing process small water balls formed on the surface of the leaves that suggest that Ghaf might show hydrophobic features. Following a drying process for three days under the sun, a heavy-duty grinder was used to turn the Ghaf material to powder, each batch was grinded for about 5 min to reach the optimum powder form for sieving. Ghaf powder was dried in the oven at 45° C. for 24 hours. Finally sieving the powder for around 20 min using Auto Sieve Shaker to 160 µm.

Polylactic acid (referred to herein as "PLA") is a biodegradable polymer which was obtained in the institute laboratory.

Overhead mechanical mixer was used to mix three samples of filler proportions ranging from 5 wt. % 10%, 15% of Ghaf and 100%, 95%, 90% and 85% of PLA at specific speed at 60 rpm for 6 minutes at 190° C. to form polymer matrixes. After mixing, the samples were fed into an injection molding machine to inject the composites at 185° C. into specific molds, forming the biodegradable materials.

Figure 2:
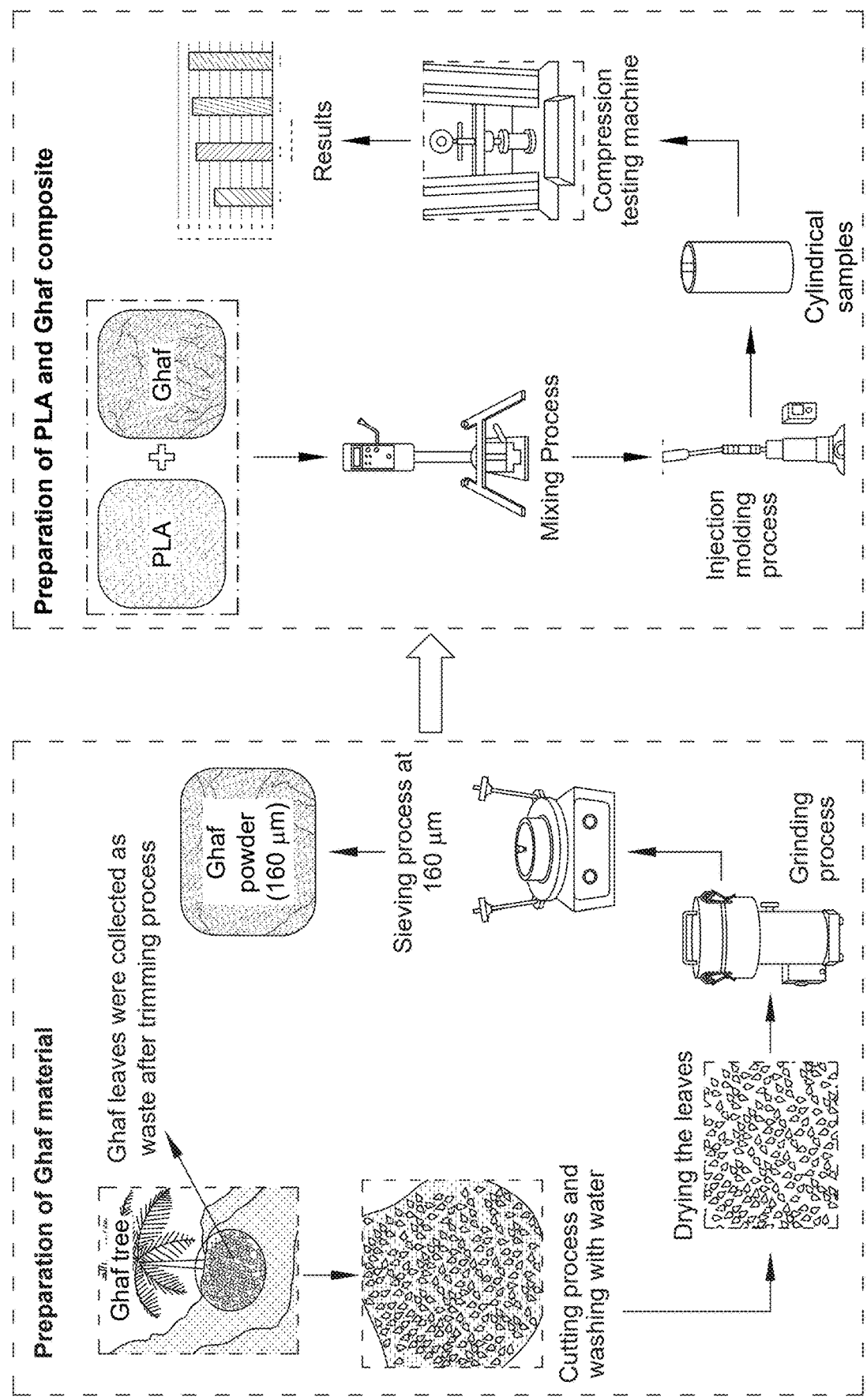
FIG. 2 is flow diagram depicting an exemplary method of manufacturing a biocomposite material, in accordance with an embodiment of the present invention.

The mold previously were sprayed with mold releaser, and the stainless-steel molds were set under the hood for 45 min to cool. Finally, the samples were collected for further testing, such as compression tests and thermal insulation. FIG. 1 illustrates the samples (i.e. the biocomposite material molds, in accordance with an embodiment of the present invention). FIG. 2 is flow diagram depicting the method used for manufacturing the biocomposite material molds illustrated in FIG. 1.

Results and Discussion

Figure 3:
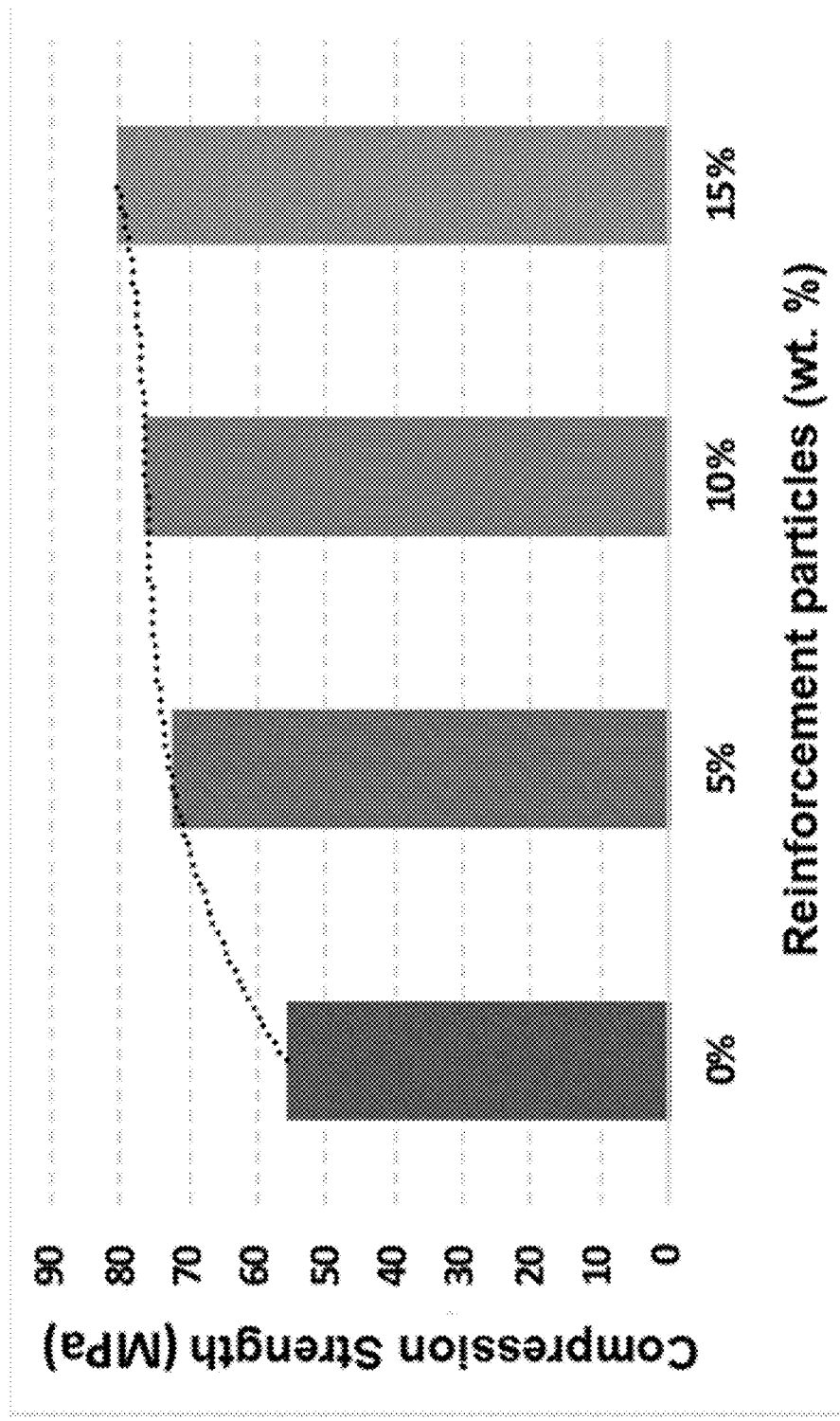
FIG. 3 is a graph illustrating the compression strength of an exemplary biocomposite material, in accordance with an embodiment of the present invention.

FIG. 3 is a graph illustrating the compression strength of an exemplary biocomposite material, in accordance with an embodiment of the present invention. The mathematical model of compression strength for the biocomposite versus the reinforcement particles weight percentages is represented as:

$$y = 2.3021x^3 - 20.421x^2 + 61.867x + 12.239$$

Compression strength (herein referred to as "CS") indicates a material's capacity to resist forces that tend to reduce its size. As shown in FIG. 3, with 0 wt. % of the reinforcement particles the CS of the biocomposite material is recorded at 55.98 MPa, which represents its baseline ability to withstand compressive forces. However, with the gradual addition the reinforcement particles, there is a marked improvement in the CS values. For instance, the inclusion of 5 wt. % of the reinforcement particles raises the CS to 72.70 MPa, and with 10 wt. % of the reinforcement particles, it further increases to 76.20 MPa. At 15 wt. % of the reinforcement particles, the CS reaches its highest value of 80.30 MPa. This progressive increase highlights how the reinforcement particles according to the present invention strengthens the polymer matrix under compressive loads. The improvement of CS is due to the ability of the reinforcement particles to act as reinforcement agents in the polymer matrix.

Without being bound to theory, the reinforcement particles may be dispersed through the polymer matrix and fit into the interstices within the PLA chains, thus providing the linkages that are missing in a neat PLA to enhance the material's mechanical strength. These reinforcement particles become stress-transfer agents, spreading the applied load over the volume of the composite and thus relieving the concentration of stress that might result in failure. The resultant biocomposite material is considerably more rigid and even stronger, besides providing better bearing against compressive loads. This reinforcement is beneficial in places where the composite might be in contact with compressive forces, for instance, in load-carrying structures or structures where durability is paramount.

Figure 4:
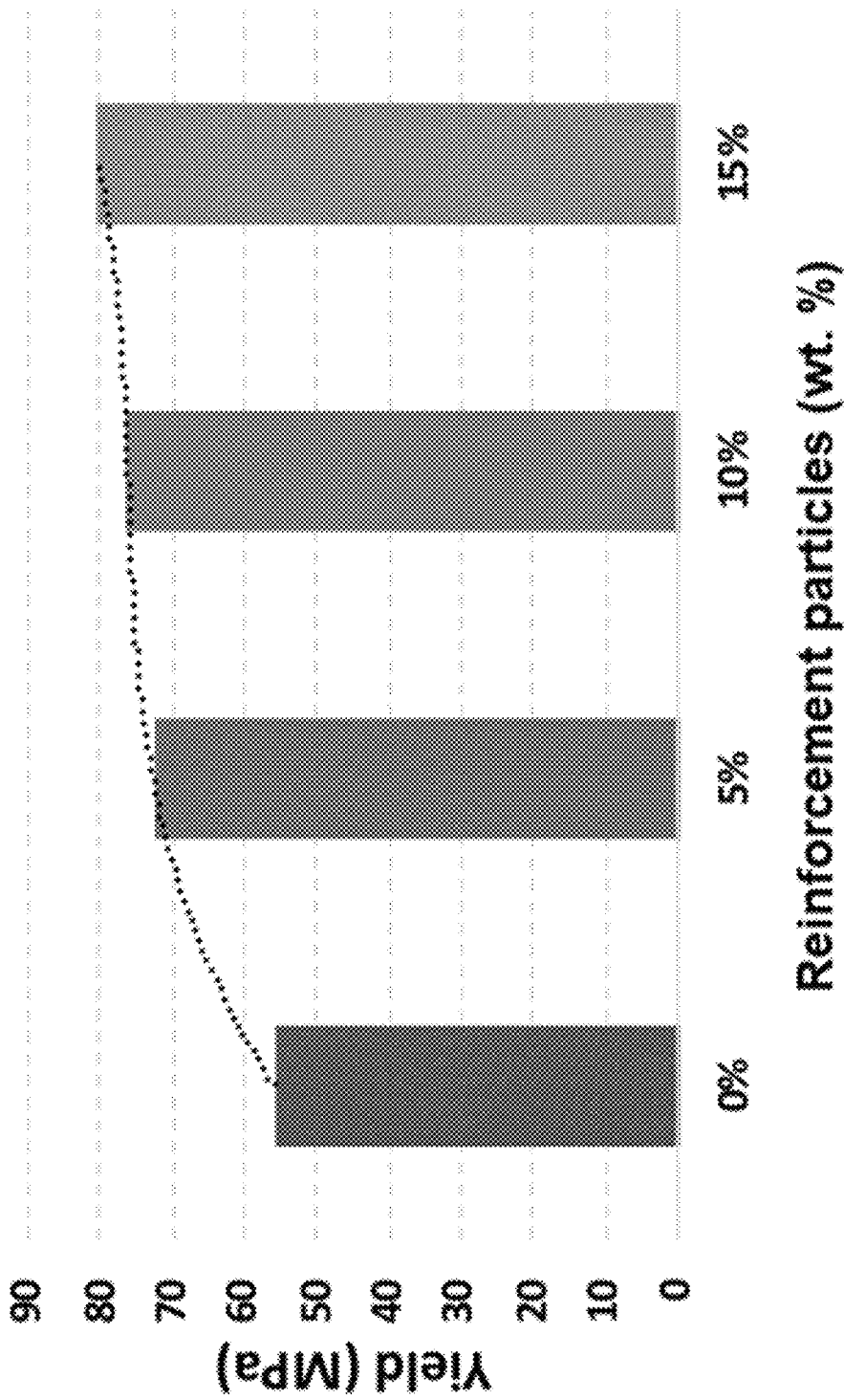
FIG. 4 is a graph illustrating the yield strength of an exemplary biocomposite material, in accordance with an embodiment of the present invention.

FIG. 4 is a graph illustrating the yield strength of an exemplary biocomposite material, in accordance with an embodiment of the present invention. The mathematical model of yield strength for the biocomposite versus the reinforcement particles weight percentages is represented as:

$$y = 2.2992x^3 - 20.403x^2 + 61834x + 12243$$

Yield strength is a fundamental mechanical property that defines the point at which a material begins to deform plastically, meaning that it will not return to its original shape once the load is removed. As illustrated in FIG. 4, with 0 wt. % of the reinforcement particles the yield strength is measured at 55.97 MPa. However, with the incorporation of 5 wt. % of the reinforcement particles, this value rises significantly to 72.69 MPa. The addition of 10 wt. % of the reinforcement particles further increases the yield strength to 76.19 MPa, and at 15 wt. % of the reinforcement particles, it reaches 80.27 MPa. This improvement in yield strength indicates that the composite can endure higher levels of stress without undergoing permanent deformation.

Without being bound to theory, the increase in the yield strength of the added reinforcement particles can be attributed to improved interfacial adhesion between the reinforcement particles and the PLA matrix. Stress between these two components hinders the mobility of polymer chains within the PLA which limits ability to undergo deformation during application of stress. This strong interfacial adhesion restrains the movements of polymer chains, one of the major sources of plastic deformation in pure polymers. Therefore, the biocomposite must suffer a higher force to undergo plastic deformation. The enhanced yield strength indicates that the biocomposite material according to the present invention has significantly improved strength than the parent materials and is more appropriate for uses that require high strength or resistance to deformation, for example, in structural applications or mechanical load bearing parts. In addition, the reinforcement effect from the particles can increase the stability and applicability of the composite in service under significant loads.

Figure 5:
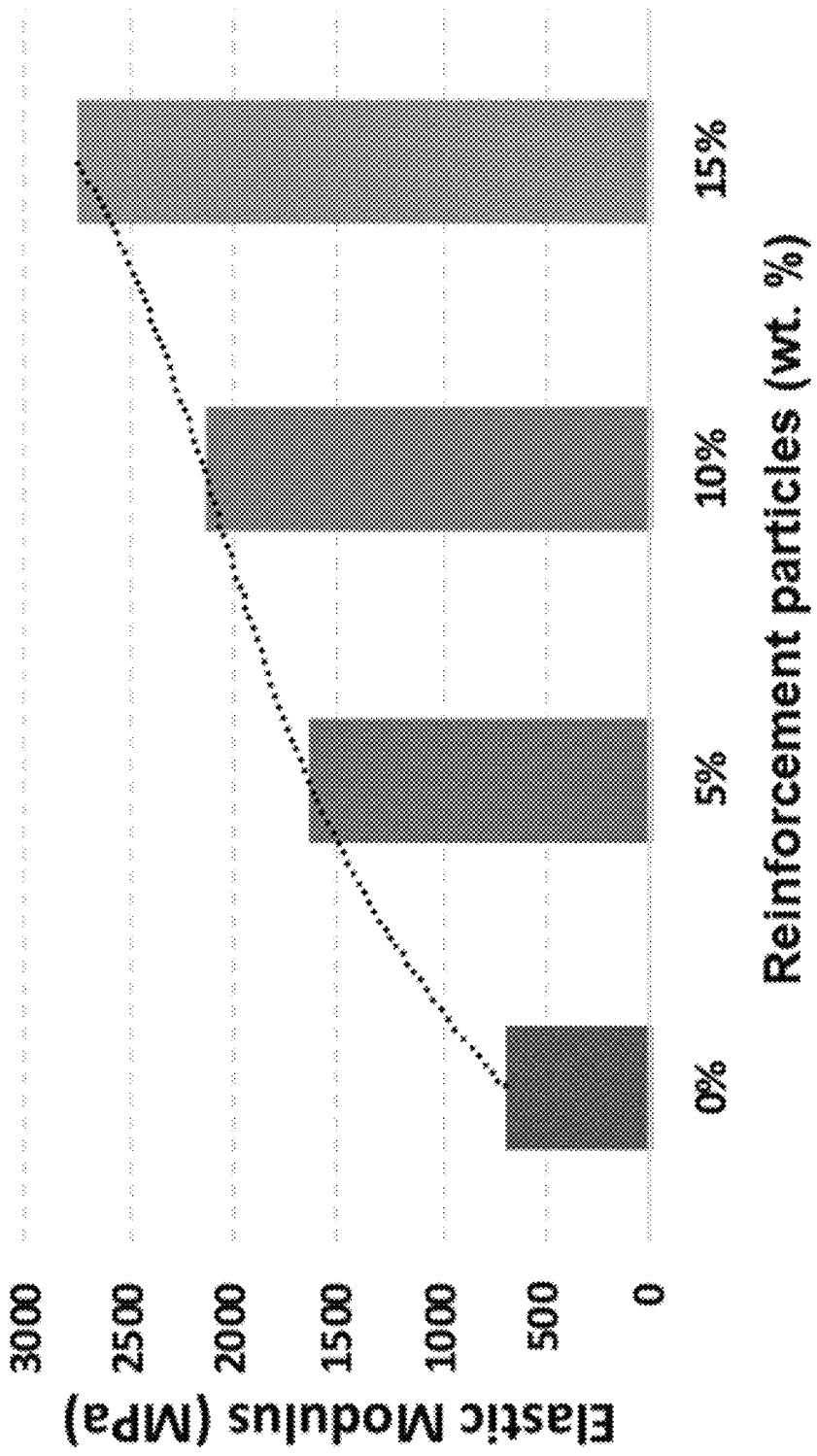
FIG. 5 is a graph illustrating the elastic modulus of an exemplary biocomposite material, in accordance with an embodiment of the present invention.

FIG. 5 is a graph illustrating the elastic modulus of an exemplary biocomposite material, in accordance with an embodiment of the present invention. The mathematical model of elastic modulus for the biocomposite versus the reinforcement particles weight percentages is represented as:

$$y = 93.333x^3 - 784x^2 + 2645.7x - 1256$$

As shown in FIG. 5 the elastic modulus is relatively low with 0 wt. % of the reinforcement particles. However, with 5 wt. % of the reinforcement particles, the modulus jumps to 1646 MPa, indicating a significant enhancement in stiffness. This value further increases to 2145 MPa with 10 wt. % of the reinforcement particles and reaches a peak of 2756 MPa with 15 wt. % of the reinforcement particles. These results demonstrate how the incorporation of the reinforcement particles transforms the PLA matrix from a relatively flexible material into a much stiffer composite.

Without being bound to theory, this may be due to the incorporation of reinforcement particles, the elasticity of the base material PLA gets somewhat reduced and the structure becomes stiffer. These hard particles restrict the PLA polymer chains' mobility, which limits how elastic the material may become under stress. This reduced mobility means increased modulus as the composite becomes more resistant to elastic deformation. The reinforcement contributed by the particles makes the resulting material less flexible or WWW when it is bent or deformed when subjected to various loads. This increase in stiffness is even more desirable where stiffness and dimensional accuracy are paramount for a product, as is often the case with car, aircraft, and construction components. Also, the greater Modulus of the biocomposite material according to the present invention makes it desirable for accurate engineering functions, especially in applications where slight team deflection is acceptable.

Figure 6:
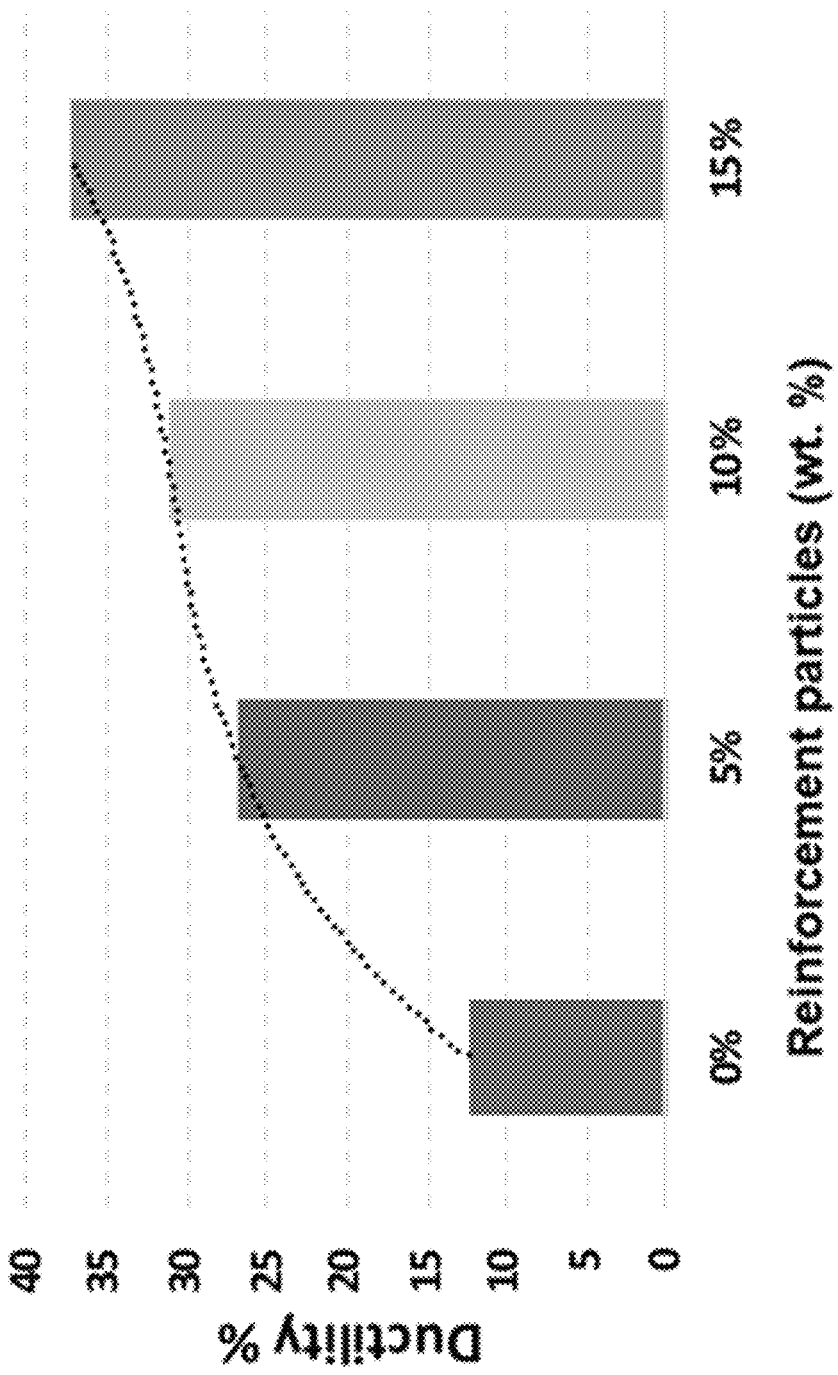
FIG. 6 is a graph illustrating the ductility of an exemplary biocomposite material, in accordance with an embodiment of the present invention.

FIG. 6 is a graph illustrating the ductility of an exemplary biocomposite material, in accordance with an embodiment of the present invention. The mathematical model of ductility for the biocomposite versus the reinforcement particles weight percentages is represented as:

$$y = 1.9639x^3 - 16.855x^2 + 51.239x - 23.915$$

Ductility, often expressed as a percentage of elongation or strain before failure, measures the material's capacity to undergo plastic deformation without fracturing. In the biocomposite, ductility significantly increases with the addition of the reinforcement particles, as illustrated in FIG. 5. With 0 wt. % of the reinforcement particles, the ductility is recorded at 12.47%. This value rises to 26.93% with 5 wt. % of the reinforcement particles, 31.24% with 10 wt. % of the reinforcement particles, and 37.20% with 15 wt. % of the reinforcement particles. The notable increase in ductility with added Ghaf particles is an indication that the biocomposite not only becomes stronger but also more flexible, able to withstand larger strains before breaking. The increase in ductility is surprising because adding sturdy particles into a polymer matrix typically means creating a more brittle material.

On the other hand, the reinforcement particles seem to behave as stress concentrators that lead to plastic deformation in the matrix. Globally dispersed, these particles produce a series of stress concentrations and establish a region of stress concentration where the PLA matrix can deform and Rogers-flex easily under load thus increasing the energy-absorbing capacity of the composite (Chawla & Chawla, 2019). Due to this extra ductility it brings benefits since the composite is less likely to fail in a brittle manner and is capable of more significant impact loads or dynamic stresses.

The material is relatively flexible owing to a higher ductility, and this material would therefore be suitable in parts that require both strength and flexibility, such as in automotive interior panels, protective gears and clothing, or packaging. This combination of higher strength and higher ductility is evidence that the biocomposite material according to the present invention is promising.

Figure 7:
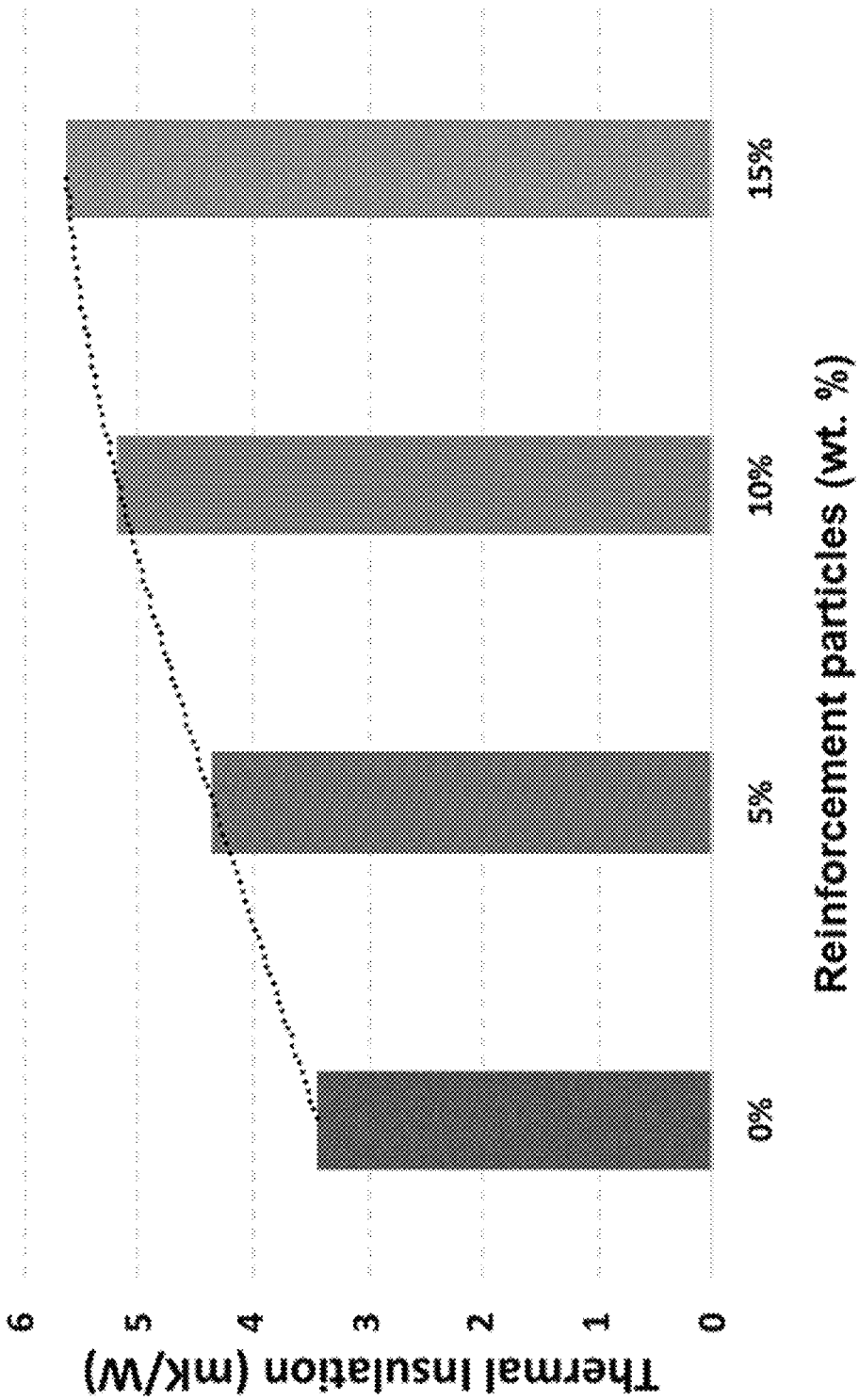
FIG. 7 is a graph illustrating the thermal insulation of an exemplary biocomposite material, in accordance with an embodiment of the present invention.

FIG. 7 is a graph illustrating the thermal insulation of an exemplary biocomposite material, in accordance with an embodiment of the present invention. The mathematical model of thermal insulation for the biocomposite versus the reinforcement particles weight percentages is represented as:

$$y = -0.0469x^3 + 0.2406x^2 + 0.5085x + 2.7508$$

As shown in FIG. 7, adding the reinforcement particles into PLA affects the formation of a biocomposite material used in comparison to 0 wt. % of the reinforcement particles which tends to melt or deform with heat. Heat insulation is improved by the resistance to transfer offered at increased temperatures due to the strong structure of the reinforcement particles. At 0 wt. %, the thermal insulation is at 3.5 mK/W. As the reinforcement particles is increased to 5 wt. %, the thermal insulation is at 4.4 mK/W. At a reinforcement particles percentage of 10 wt. %, the thermal insulation increased to 5.2 mK/W, and finally, at 15 wt. %, the thermal insulation increased to 5.6 mK/W. With the incorporation of organic fibers, the thermal conductivity of the blended material is lower than that of the pure PLA, therefore, such a material is suitable in functions where constant or oscillating high temperatures are employed such as electronics or car parts.

Without being bound by theory, this improved barrier properties for thermal insulation can be attributed to the surprising compatibility between PLA and the reinforcement particles where the rigid chain structure of the reinforcement particles chains intermingles with the PLA matrix. Moreover, the reinforcement particles enhances the physical properties of PLA, particularly the impact strength and the tensile fatigue strength, for applications in higher demanding conditions.

In sum, Thermal Insulation of the biocomposite material according to the present invention successfully blends the environmentally friendly characteristic of PLA with the high thermal conductivity of the reinforcement particles to develop a material that is far superior to the thermal constraints of neat PLA.

Figure 8:
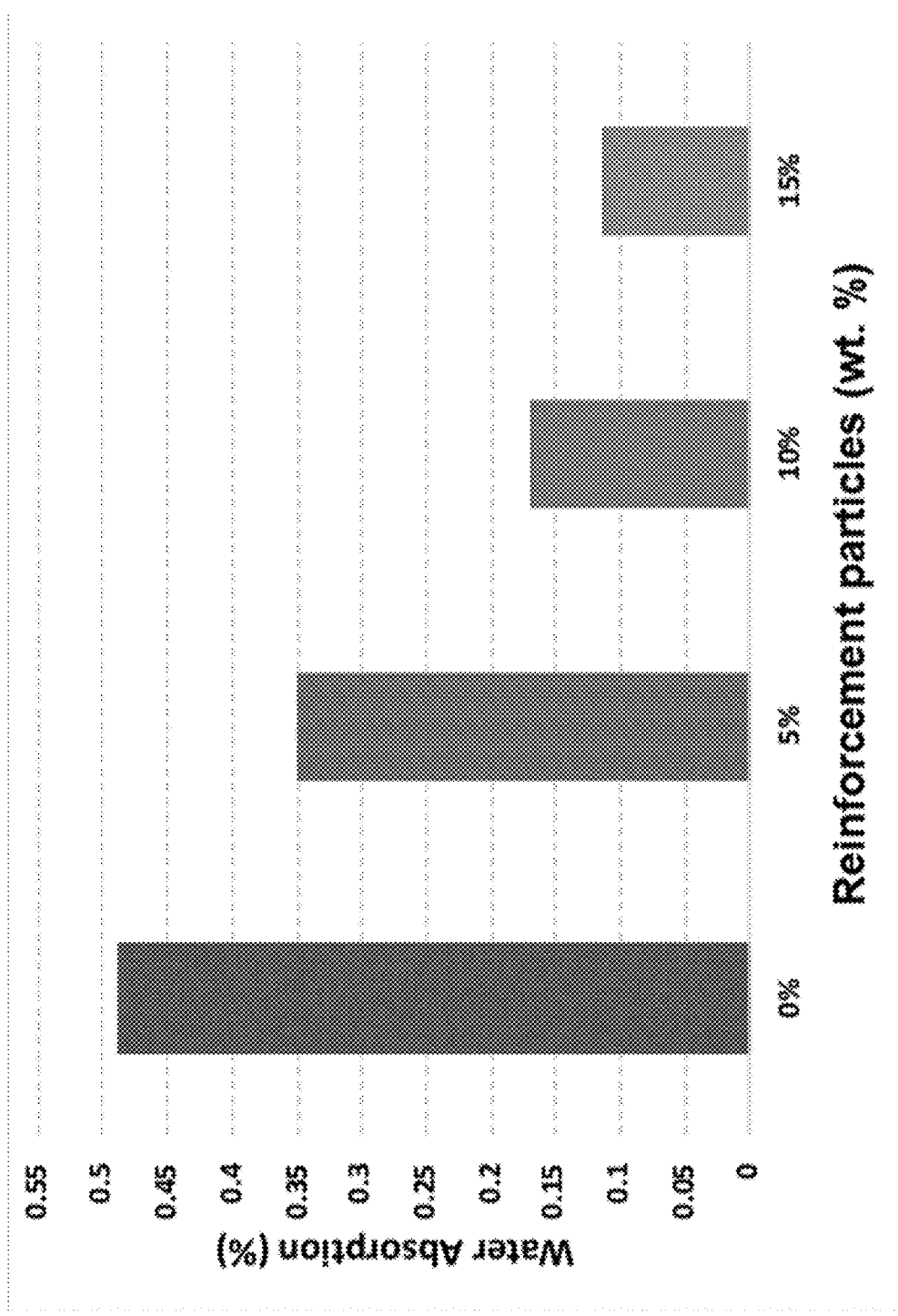
FIG. 8 is a graph illustrating the water absorption of an exemplary biocomposite material, in accordance with an embodiment of the present invention.

FIG. 8 is a graph illustrating the water absorption of an exemplary biocomposite material, in accordance with an embodiment of the present invention. The mathematical model of water absorption for the biocomposite versus the reinforcement particles weight percentages is represented as:

$$y = 0.0278x^3 - 0.187x^2 + 02268x + 0.4218$$

Natural waxes and chemicals in the leaves of *Prosopis cineraria* (Ghaf) enable the creation of a water-repellent surface as shown in FIG. 8 the water absorption percentage is decreasing with the increase of the reinforcement particles weight percentage. At 0 wt. % of the reinforcement particles the water absorption percentage is 0.49%. The observed reduction in the ability of these specific specimens to absorb water, as evidenced by test results of 0.34%, 0.17%, and 0.11% for 5 wt. %, 10 wt. %, and 15 wt. % of the reinforcement particles.

Without being bound by theory, this hydrophobic nature can be attributed to the formation of epicuticular wax layers, which create microscopic rough surfaces on the leaf's surface. Based on the chemical constituents, including alkaloids, saponins, amino acids, flavonoids, and polyphenols present in the leaf, the reduction in water absorption when Ghaf leaves are incorporated can be justified (Upadhyay et al., 2022). For instance, such leaves possess relatively high levels of hydrophobic components, such as specific flavonoids and terpenoids, which could effectively avoid water molecules. The evolution of these properties benefits the tree in surviving in dry areas since it does not lose a lot of water or allow for excessive evaporation to occur. When used with PLA, these hydrophobic attributes are preserved and amplified. The leaf particles distribute in the PLA matrix, and several layers of hydrophobic barriers effectively hinder water infiltration and absorption. This synergistic interaction between the native hydrophobic components of Ghaf leaves and PLA might render this blend more useful in applications where water resistance is essential. Ghaf leaves, respectively, lends support to the scientific studies conducted on the nature and ability of *Prosopis cineraria* leaves to provide water-repellent characteristics. The biocomposite material of the present invention is, thus, ideal for applications in humid or wet environments due to its hydrophobic characteristics.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims. The present invention will now be described in further detail by the non-limiting examples provided below.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

What is claimed is:

1. A biocomposite material comprising a polymer matrix, wherein said polymer matrix comprises:
   polylactic acid; and
   a plurality of reinforcement particles comprising *Prosopis cineraria*,
   wherein the plurality of reinforcement particles are dispersed within the polymer matrix,
   wherein the plurality of reinforcement particles are present in an amount between about 5 wt. % to about 15 wt. %, based on the total weight of the polymer matrix,
   and wherein the plurality of reinforcement particles have an average particle diameter of about 100 μm to about 200 μm.

2. The biocomposite material according to claim 1, wherein the material exhibits a compression strength in the range of about 60 MPa to about 85 MPa.

3. The biocomposite material according to claim 1, wherein the material exhibits an elastic modulus in the range of about 1500 MPa to about 3000 MPa.

4. The biocomposite material according to claim 1, wherein the material exhibits an improved ductility, measured as a percentage of elongation before failure, in the range of about 20.0% to about 50.0%.

5. The biocomposite material according to claim 1, wherein the material exhibits thermal insulation in the range of about 4.0 mK/W to about 6.0 mK/W.

6. The biocomposite material according to claim 1, wherein the material exhibits a reduction in overall water absorption capacity with a water absorption rate of about 0.05% to about 0.40%.

7. The biocomposite material according to claim 6, wherein the material exhibits a reduction in overall water absorption capacity with a water absorption rate of about 0.11%, wherein the plurality of reinforcement particles are present in an amount about 15 wt. %, based on the total weight of the polymer matrix.

* * * * *